United States Patent
Brinkmann et al.

(10) Patent No.: US 8,386,654 B2
(45) Date of Patent: Feb. 26, 2013

(54) SYSTEM AND METHOD FOR TRANSFORMING PCIE SR-IOV FUNCTIONS TO APPEAR AS LEGACY FUNCTIONS

(75) Inventors: Hubert E. Brinkmann, Spring, TX (US); John M. Cagle, Houston, TX (US); Barry S. Basile, Houston, TX (US); David L. Matthews, Cypress, TX (US); Paul V. Brownall, Houston, TX (US); William F. Doss, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 72 days.

(21) Appl. No.: 12/934,035

(22) PCT Filed: Mar. 25, 2008

(86) PCT No.: PCT/US2008/058110
§ 371 (c)(1),
(2), (4) Date: Sep. 22, 2010

(87) PCT Pub. No.: WO2009/120187
PCT Pub. Date: Oct. 1, 2009

(65) Prior Publication Data
US 2011/0016235 A1    Jan. 20, 2011

(30) Foreign Application Priority Data
Mar. 25, 2008    (WO) ............... PCT/US08/58110

(51) Int. Cl.
*G06F 3/00* (2006.01)

(52) U.S. Cl. .................................................. 710/8

(58) Field of Classification Search .............. 710/8
See application file for complete search history.

(56) References Cited

U.S. PATENT DOCUMENTS

| | | | | |
|---|---|---|---|---|
| 5,751,975 A * | 5/1998 | Gillespie et al. | ........... | 710/315 |
| 5,933,613 A * | 8/1999 | Tanaka et al. | ........... | 710/314 |
| 6,119,191 A | 9/2000 | Neal et al. | | |
| 6,721,839 B1 | 4/2004 | Bauman et al. | | |
| 7,877,521 B2 * | 1/2011 | Suzuki et al. | ........... | 710/10 |
| 2008/0040526 A1 | 2/2008 | Suzuki et al. | | |

FOREIGN PATENT DOCUMENTS

| | | |
|---|---|---|
| JP | 10-334032 | 12/1998 |
| JP | 11-238030 | 8/1999 |
| JP | 11-288400 | 10/1999 |
| JP | 2000-066992 | 3/2000 |
| JP | 2001-027920 | 1/2001 |
| JP | 2001-167047 | 6/2001 |

OTHER PUBLICATIONS

Anonymous, PCI ExpressBase Specification Revision 1.0, Chapter 5: Software Initialization and Configuration, Apr. 29, 2002, PCI-SIC, XP002664729, pp. 215-291.
Anonymous, Single Root I/O Virtualization and Sharing Specification Revision 1.0, Sep. 11, 2007, PCI-SIG, XP002664728, 84 pages.
International Searching Authority, The International Search Report and the Written Opinion, Mar. 30, 2010, 11 Pages.

* cited by examiner

Primary Examiner — Chun-Kuan Lee

(57) ABSTRACT

A system for transforming a single root input/output virtualization (SR-IOV) function to appear as a legacy function, and a corresponding method includes a switch platform coupled between a legacy host and a SR-IOV-enabled device. The switch platform includes a processor programmed to discern configuration cycles by type and to process the configuration cycles, and one or more local registers that store data related to the configuration cycles.

20 Claims, 7 Drawing Sheets

| BYTE OFFSET | | | |
|---|---|---|---|
| 00h | DEVICE ID | | VENDOR ID |
| 04h | STATUS | | COMMAND |
| 08h | CLASS CODE | | REVISION ID |
| 0Ch | BIST | HEADER TYPE | MASTER LATENCY TIMER | CACHE LINE SIZE |
| 10h | BASE ADDRESS REGISTERS | | |
| 14h | | | |
| 18h | | | |
| 1Ch | | | |
| 20h | | | |
| 24h | | | |
| 28h | CARDBUS CIS POINTER | | |
| 2Ch | SUBSYSTEM ID | | SUBSYSTEM VENDOR ID |
| 30h | EXPANSION ROM BASE ADDRESS | | |
| 34h | RESERVED | | CAPABILITIES POINTER |
| 38h | RESERVED | | |
| 3Ch | MAX_LAT | MAX_GNT | INTERRUPT PIN | INTERRUPT LINE |

*FIG. 2*

SYSTEM AND METHOD FOR TRANSFORMING PCIE SR-IOV FUNCTIONS TO APPEAR AS LEGACY FUNCTIONS

BACKGROUND

Computer systems employ a wide variety of peripheral components or input/output (I/O) devices. For example, a typical computer system usually contains a monitor, a keyboard, a mouse, a network controller, a disk drive or an array of disk drives, and, optionally, a printer. High performance computer systems such as servers have more complex I/O device requirements.

An example of a host processor of a computer system connected to I/O devices through a component bus is defined by the PCI (peripheral component interconnect) Local Bus Specification, published by the PCI Special Interest Group. During system initialization, the host processor loads a device driver for each PCI device on the PCI bus. A typical PCI device includes multiple configuration registers located within a configuration memory space of each respective PCI device. The configuration registers including identification registers, such as, for example, the vendor ID, device ID or revision register, are read by the device driver and the host system during the initialization or normal operations to identify the PCI device. Typically, the identification registers are hardwired to fixed values during the manufacturing processes of the PCI device and they are not modifiable by the device driver or the operating system (OS) of the host. As a result, a legacy device driver that is looking for specific identification of a PCI device will not work with a PCI device having different identification information, such as, a different vendor ID or a different device ID, etc.

PCI Express (PCIe) is an improvement over PCI and defines a high performance, general purpose I/O interconnect for a wide variety of computing and communications platforms. Key PCIe attributes, such as the PCI usage model, load-store architectures, and software interfaces, are maintained in PCIe, but PCI's parallel bus implementation is replaced in PCIe with a highly scalable, fully serial interface. PCIe takes advantage of advanced point-to-point interconnects, switch-based technology, and packetized protocols to deliver improved performance features.

Input/Output Virtualization (IOV) is a name given to the capability of an I/O device to be used by more than one operating system (OS—sometimes called a system image) running on the same or different CPUs. Modern computing and storage systems use IOV because IOV offers improved management of information technology resources through load balancing and effective use of underutilized resources. For example, IOV allows a limited set of resources, such as computer memory, to be more fully used, with less idle time, by making that resource available on a shared basis among a number of different operating systems. Thus, instead of having separate memory for each OS, where each separate memory is underused, a shared memory is available to all operating systems and the shared memory experiences a higher utilization rate than that of any of the separate resources.

While computing and communications systems incorporating PCIe technology are proliferating, many legacy (e.g., PCI) systems remain in use. When such legacy systems are mated to the newer PCIe systems, communications between these legacy systems and the newer PCIe systems can create problems.

SUMMARY

What is disclosed is a system for transforming a single root input/output virtualization (SR-IOV) function so that it appears as a legacy function. The system includes a switch platform coupled between a legacy host and a SR-IOV-enabled device. The switch platform includes a processor programmed to discern configuration cycles by type and to process the configuration cycles, and one or more local registers that store data related to the configuration cycles. The switch platform processor also supervises or controls other operations of the switch platform.

Also disclosed is a method for transforming between SR-IOV virtual functions and an address space of a legacy host processor. The method includes the steps of receiving a configuration cycle from the host processor, comparing the configuration cycle from the host processor to a configuration register and determining a type of configuration cycle, performing a transform operation on the received configuration cycle, and returning a configuration complete cycle to the host processor.

Still further what is disclosed is a system that performs transforms such that a legacy host processor can be assigned virtual functions of a SR-IOV end device. The system includes an intelligent switch fabric intermediate between the host processor and the end device. The switch fabric includes processing means to identify a type of end device from which a virtual function emanates, storage means for storing selected information related to the end device, means for transforming incoming host defined destination information into corresponding end device defined destination information, and means for transforming incoming end device completion information for the end device into corresponding completion information for the host processor. The system further includes means for receiving configuration cycles and configuration complete cycles at the switch fabric.

DESCRIPTION OF THE DRAWINGS

The Detailed Description will refer to the following drawings in which like numbers refer to like items, and in which:

FIG. 2 illustrates an example of a configuration space for the system of FIG. 1;

DETAILED DESCRIPTION

In the following description, a system comprised of mutually connected devices in PCI Express will be referred to as PCIe system, several kinds of devices to be connected will be referred to as PCIe devices, a bus for connecting the devices will be referred to as PCIe bus, and packets for use in communication will be referred to as PCIe packets. A system that uses technology prior to PCIe will be referred to as a legacy system and will have corresponding legacy devices and busses.

Figure 1:
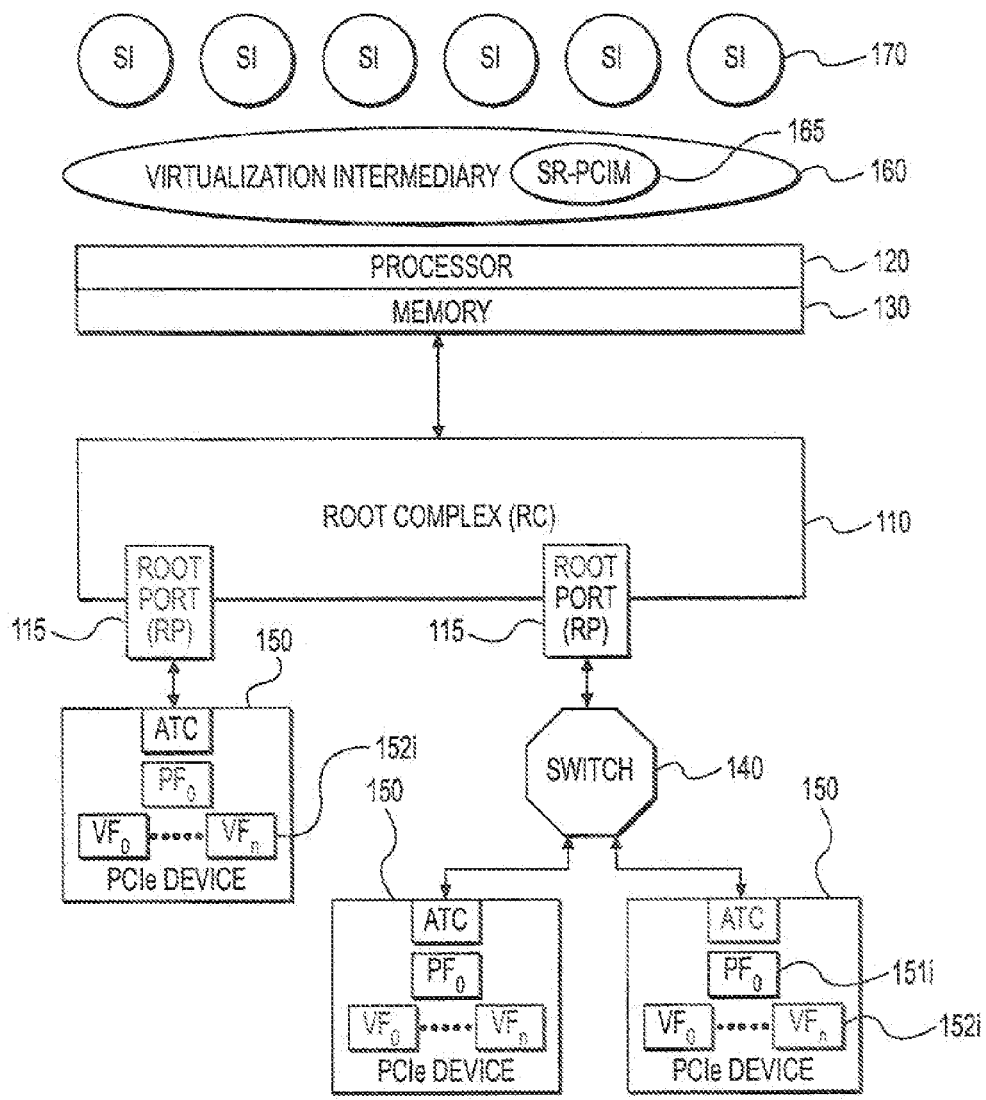
FIG. 1 is a block diagram of a PCIe-enabled computing system using a single root architecture.

Referring to FIG. 1, PCIe system 100 includes root complex 110 that connects to CPU 120 via a host bus and to memory 130 via a memory bus, for serving as a "root" of the tree topology of PCIe, a PCIe switch 140 that provides a fan-out function to the PCIe bus, and I/O devices 150 connected via the PCI bus. The CPU 120 may be a general purpose processor, an embedded processor, or a specialized processing element. The memory 130 may be a general purpose memory or an embedded memory. In general, the side of the root complex 110 adjacent to the CPU 120 of the tree topology of PCIe is referred to as upstream, and that adjacent to the I/O devices 150 is referred to as downstream. While in FIG. 1, two I/O devices 150 are connected to the PCIe switch 140, the number of the I/O devices 150 that can be connected is not limited to two. Configuration software provided in the CPU 120 is used for configuring the PCI system 100.

Each PCIe device 150 is coupled to the root complex 110 by way of a root port 115. When multiple PCIe devices 150 are coupled to a single root port 115, a switch, such as the switch 140, is placed between the root port 115 and the PCIe devices 150.

Shown associated with the processor 120 is virtualization intermediary 160, which is used to abstract the underlying hardware of the system 100 to present each of system image (SI) 170 with its own virtual computing system. The system images 170 are software elements, such as operating systems, that are used to execute applications on the system 100. Single root PCI manager (SR-PCIM) 165 is software used to configure the system's SR-IOV capability, manage physical functions (PF) and virtual functions (VF), and process associated error events. A physical function is a PCIe function that supports the SR-IOV capability and that is accessible to the SR-PCIM 165, the VI 160, or a SI 170. A virtual function is a light-weight PCIe function that is directly accessible by an SI 170. A virtual function can be serially shared by different system images 170.

Finally, note that the system 100 shown in FIG. 1 is a "single root" system. Other computing systems may use multiple roots.

The PCIe switch 140 comprises an upstream PCI-PCI bridge, an internal PCI bus, and downstream PCI-PCI bridges (components now shown). The upstream PCI-PCI bridge and downstream PCI-PCI bridges comprise respective configuration registers for retaining information on PCIe resource spaces connected downstream of the respective bridges. The PCIe resource spaces are spaces occupied under several addresses used in a PCIe system.

FIG. 2 is a diagram showing an example of an internal arrangement of a PCIe Type 0 configuration register. As examples of the addresses, the device ID designates a device number specific to a vendor, the vendor ID designates the number of a manufacturer (both offset 00h), and the class code (offset 08h) designates a device attribute. Addresses offset 10h-24h and 30h are used for base address registers. Configuration software included in the SR-PCIM 165 can identify a device by looking up the register values. The base address registers are used by the configuration software in the SR-PCIM 165 for writing a base address when allocating an address space for an I/O device. The device identification and related processes occur during PCIe configuration cycles. Such configuration cycles occur during system startup and possibly after a hot-plugging operation. As will be described below, the same register values are used in the herein disclosed translation device to make SR-IOV virtual function appear to a legacy host as legacy functions.

Returning to FIG. 1, upon start of the PCIe-based system 100, during an initial configuration cycle, all PCIe devices present in the PCIe system 100 are searched for by the configuration software 160. In particular, all PCI buses in the system 100 are scanned, and each slot in every PCI bus is checked for the attribute of a PCIe device occupying the slot. Then, configuration is achieved by sequentially allocating a PCIe resource space required by each PCIe device that is found. For example, in the PCIe system 100 of FIG. 1, the I/O devices 150 connected downstream of the PCIe switch 140 are assigned with respective resource spaces that they require, and according to the size of the spaces assigned, values in the configuration registers shown in FIG. 2 are set.

PCIe provides a hot-plugging function for active connection/disconnection of a plug of an I/O device to/from an unoccupied slot. Hot plugging is a technique that allows an I/O device or the like to be physically attached or removed while other devices in a system are in service. In the conventional PCIe system, the primary hot-plugging function works in a case, for example, in which the I/O device 150 that was attached to the PCIe switch 140 in FIG. 1 during the initial configuration cycle is replaced by a similar I/O device 150 because the former one has broken down. When the I/O device 150 is inserted into a slot, a link is established between the downstream CPU 120 and the I/O device 150, and synchronization of electric signals, exchange of credit information and the like are automatically activated. A hot-plugging register is turned on, and at the same time an interrupt is generated to the CPU 120. Triggered by the interrupt, the configuration software in the SR-PCIM 165 is invoked to configure the inserted I/O device 150 and clear the hot-plugging register. After completion of this configuration process, the inserted I/O device 150 is enabled.

While swapping I/O devices in a hot-plugging operation may be possible with the system 100, installation of an I/O device 150 into an unoccupied slot may require reconfiguration of the whole PCIe system 100, including any configuration registers held by the PCIe switch 140, and the base address registers held by other I/O devices containing information on the PCIe resource spaces that have been allocated. The reason for this is that during the initial configuration cycle, a bus number is assigned to the PCIe bus, and a device number, a function number, a 32-bit I/O space, a 32-bit memory space, and if necessary, a 64-bit memory space, are assigned to the PCIe switch 140 and I/O device 150, in a sequential manner; however, they are not assigned to any unoccupied slots. Thus, when an I/O device 150 is inserted into an unoccupied slot (e.g., in the PCIe switch 140), a PCIe resource space to be assigned to the inserted I/O device 150 may interfere with that for another I/O device 150 having used that space.

SR-IOV is a new PCIe specification that defines a new type of function called a virtual function. Virtual functions have some significant differences from prior (legacy) PCI functions, and require changes in the PCI code of any host to which SR-IOV devices would attach. As an alternative to changing the PCI code of the host, the virtual functions may be made to look like regular PCI functions. This transformation is effected as part of the configuration process executed by a PCI host. The transformation is executed in an intermediate device that resides between the host and the virtual function.

Figure 3:
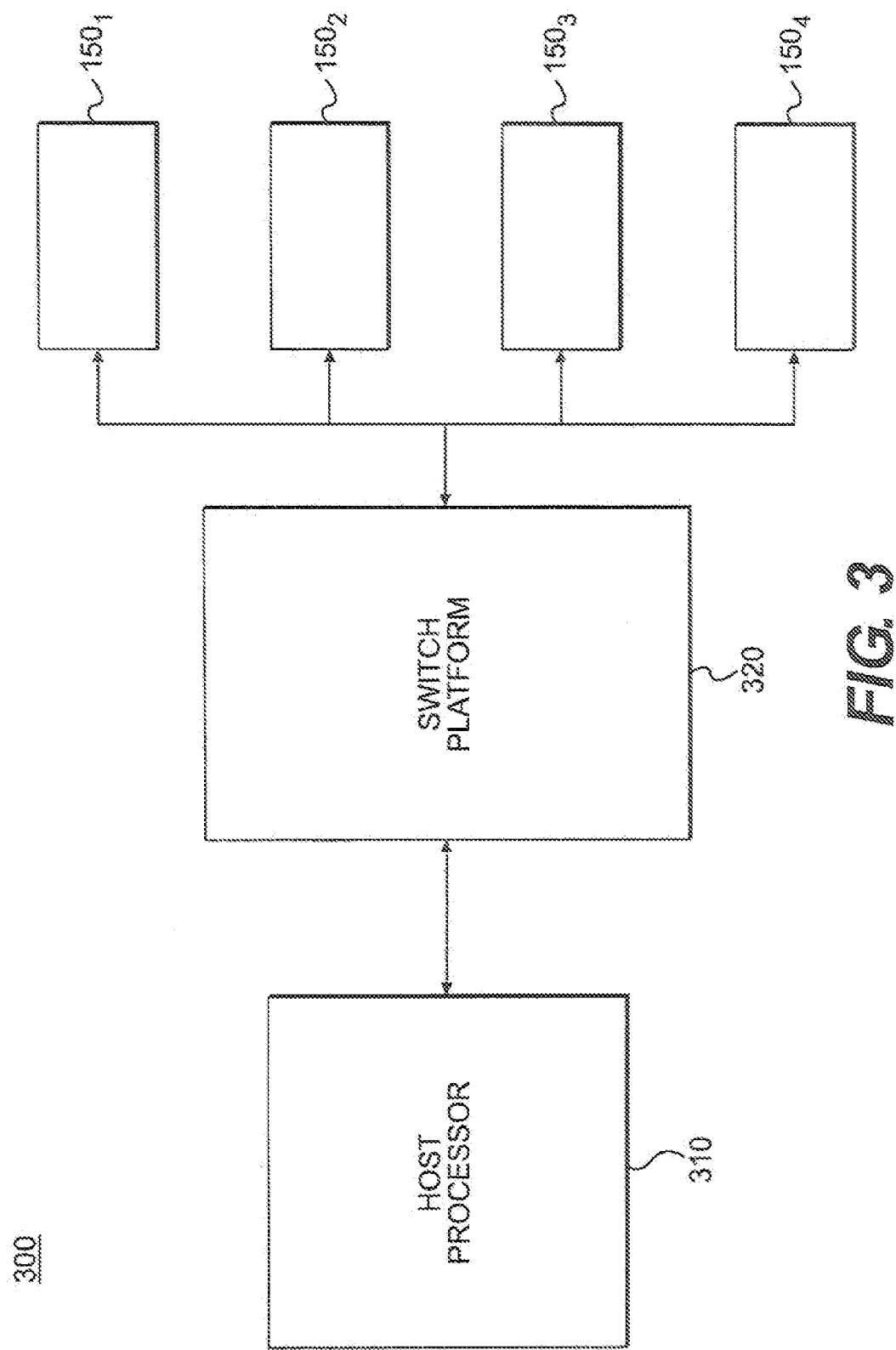
FIG. 3 illustrates exemplary elements to be added to a legacy computing system adapted to utilize the virtual functions of the system of FIG. 1.

FIG. 3 illustrates exemplary elements to be added to a legacy host processor in a computing system adapted to utilize the virtual functions of the system of FIG. 1. As shown in FIG. 3, computing system 300 includes legacy host processor 310, which is coupled through an added switch platform 320 to one or more I/O devices 150. The I/O devices 150 are similar in all pertinent respects to the corresponding devices shown in FIG. 1. That is, the I/O devices 150 shown in FIG. 3 implement virtual functions according to the SR-IOV specification. As an example, I/O device $150_1$ may represent a single Ethernet port configured according to the SR-IOV specification as four virtual Ethernet ports. As such, any of the four virtual Ethernet ports may be assigned to a specific system image, such as the system images 170 shown in FIG. 1. Additionally, the host processor 310 may access any of the four virtual Ethernet ports. However, because the host processor 310 is not a PCIe SR-IOV device, a translation operation first must be completed for the host processor 310 to interface with the I/O device $150_1$. Such translation occurs, normally, during startup of the computer system 300, when various configuration cycles are executed to enable the connected I/O devices 150. The translation is executed in switch platform 320.

Figure 4A:
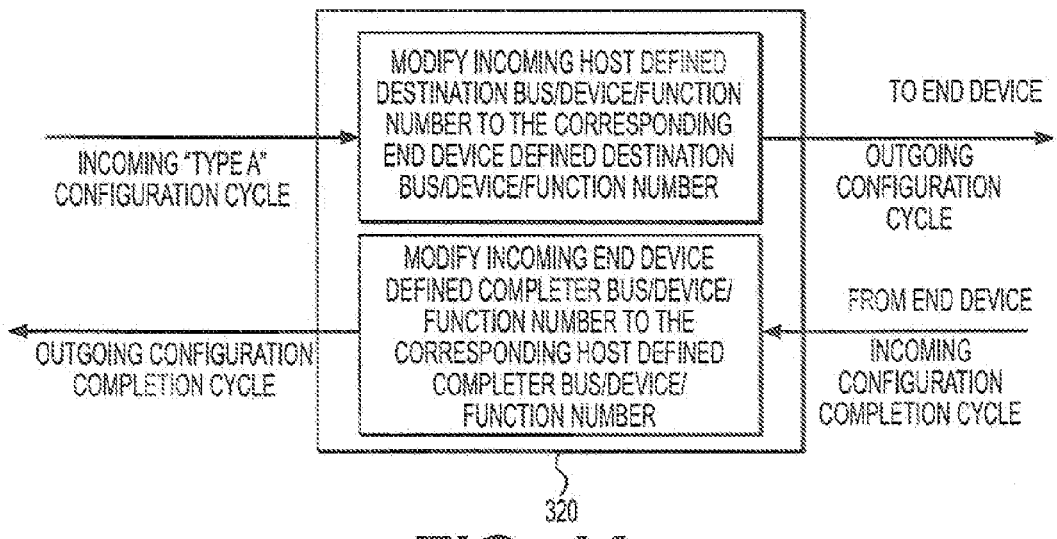
FIGS. 4A-4C illustrate exemplary mechanisms for transforming various configuration cycles so that the virtual functions of FIG. 1 will appear as legacy functions to the system of FIG. 3.
Figure 4B:
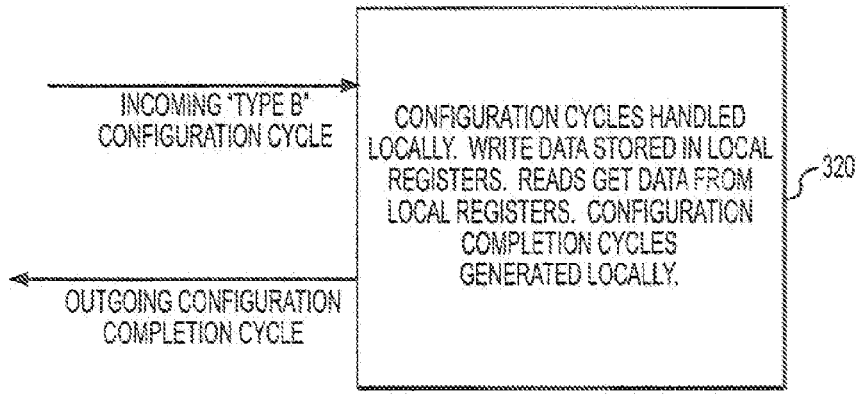
Figure 4C:
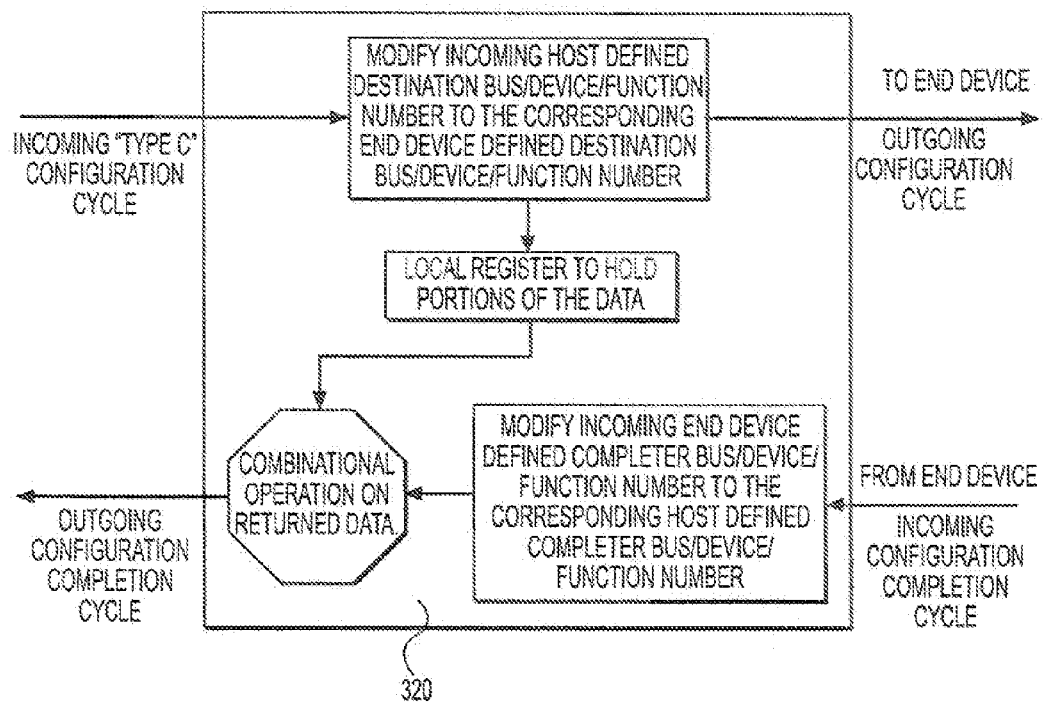

FIGS. 4A-4C illustrate exemplary mechanisms for transforming various configuration cycles so that the virtual functions of the I/O devices 150 will appear as legacy functions to the host processor of FIG. 3. There are three types of configuration cycles as shown in FIGS. 4A-4C. In FIG. 4A, an incoming type A configuration cycle from the host processor 310 is modified by the switch platform 310 by having the host defined destination bus or device function changed to correspond to the end device's (i.e., the I/O device 150) defined destination bus/device/function number. In an embodiment, type A configuration cycles are those that pertain to address spaces 08h, 0Ch, 28h, 2Ch, 34h, and 38h as shown in FIG. 2. The thus-modified configuration cycle is sent to the I/O device 150 in order to obtain specific information from the I/O device 150. A configuration completion cycle signal from the I/O device 150 to the host processor 310 similarly is transformed in the switch platform 320.

In FIG. 4B, the configuration cycles are intercepted and handled by the switch platform 320 without sending the signals to the I/O device 150. In an embodiment, this transformation applies to address spaces 10h-24h and 30h of the configuration space as shown in FIG. 2. The switch platform 320 writes data to local registers and reads data from local registers. The configuration cycles are generated locally in the switch platform 320 based on information regarding the I/O devices that is stored in the local registers.

In FIG. 4C, configuration cycles have their destination bus/device/function number modified before the configuration cycle is passed to the I/O device 150, but portions of the data are handled by the switch platform 320, which writes and reads this data to/from local registers. The incoming configuration cycles from the I/O device 150 are modified in the switch platform 320 by having the incoming I/O device defined completed bus/device/function number translated to match the corresponding completed bus/device/function number of the host processor 310, and the thus-modified signal is combined with data from the switch platform 310 local register to produce the outgoing configuration completion cycle.

Figure 5:
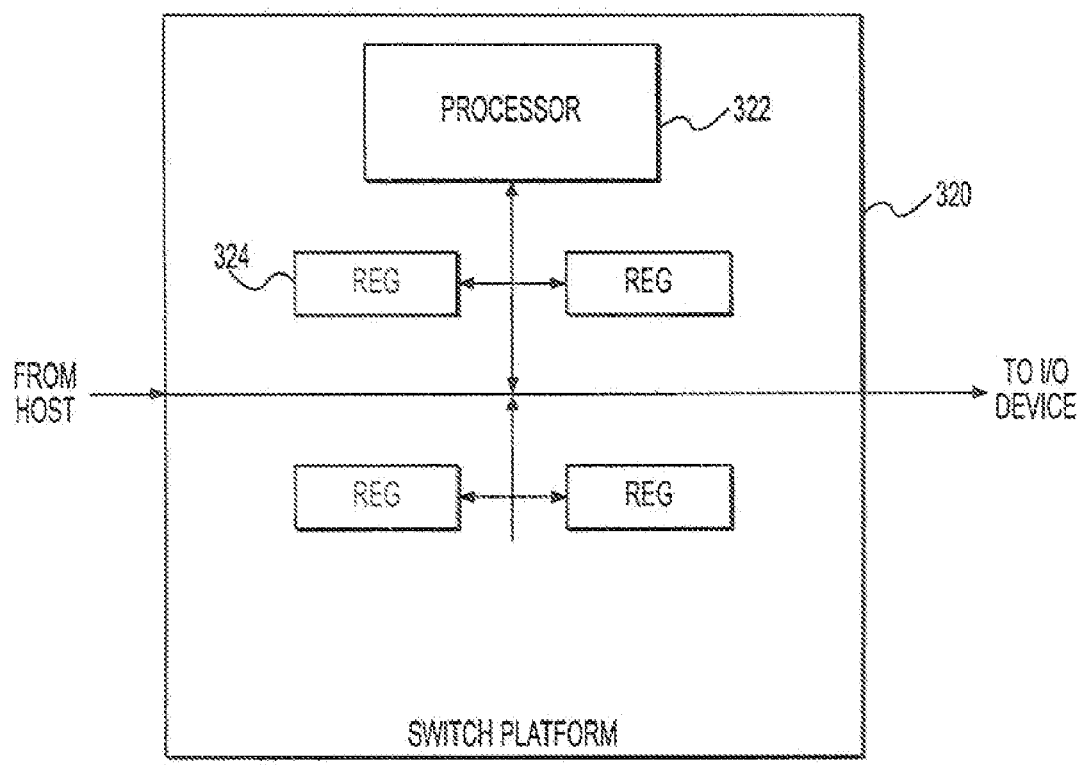
FIG. 5 illustrates an exemplary switch platform and associated controller used to effectuate the transformations described with respect to FIGS. 4A-4C.

FIG. 5 is a block diagram of an exemplary switch platform 320. In FIG. 5, the switch platform 320 can be seen to include processor 322, and local registers 324. The processor 322 is programmed to intercept configuration cycles from the host processor 310 and determine which of the three mechanisms of FIGS. 4A-4C to apply so as to effectuate the required transform. With some transformations, the processor 322 will read data from or write data to the local registers 324.

Figure 6:
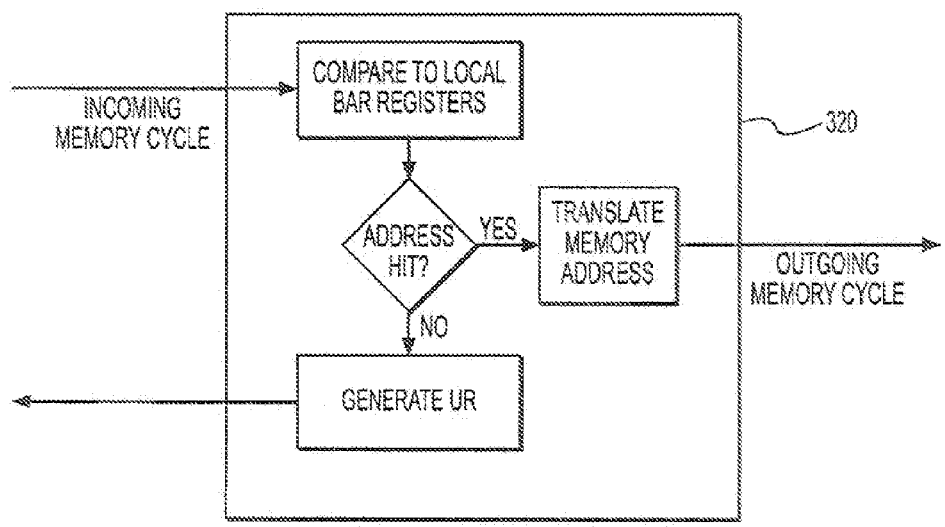
FIG. 6 illustrates an exemplary mechanism for effectuating a memory transformation.

FIG. 6 illustrates an exemplary mechanism for effectuating a memory transformation. As before with respect to the configuration cycles, for the host processor 310 to access memory, because of the configuration space register (example shown in FIG. 2), some transformation of memory addresses may be needed. In particular, the configuration space register 180 shows base address registers (BARs) for address offsets 10h-24h and for 30h. These address offsets are transformed so that the host processor 310 will correctly interpret any memory address function. As shown in FIG. 6, the host processor 310 issues a memory cycle, which is received at the switch platform 320 and is compared to the local BARS. If a match is found (address hit), the address is translated using the processor 322. If the comparison shows no match, the processor 322 issues an unsupported request.

Figure 7:
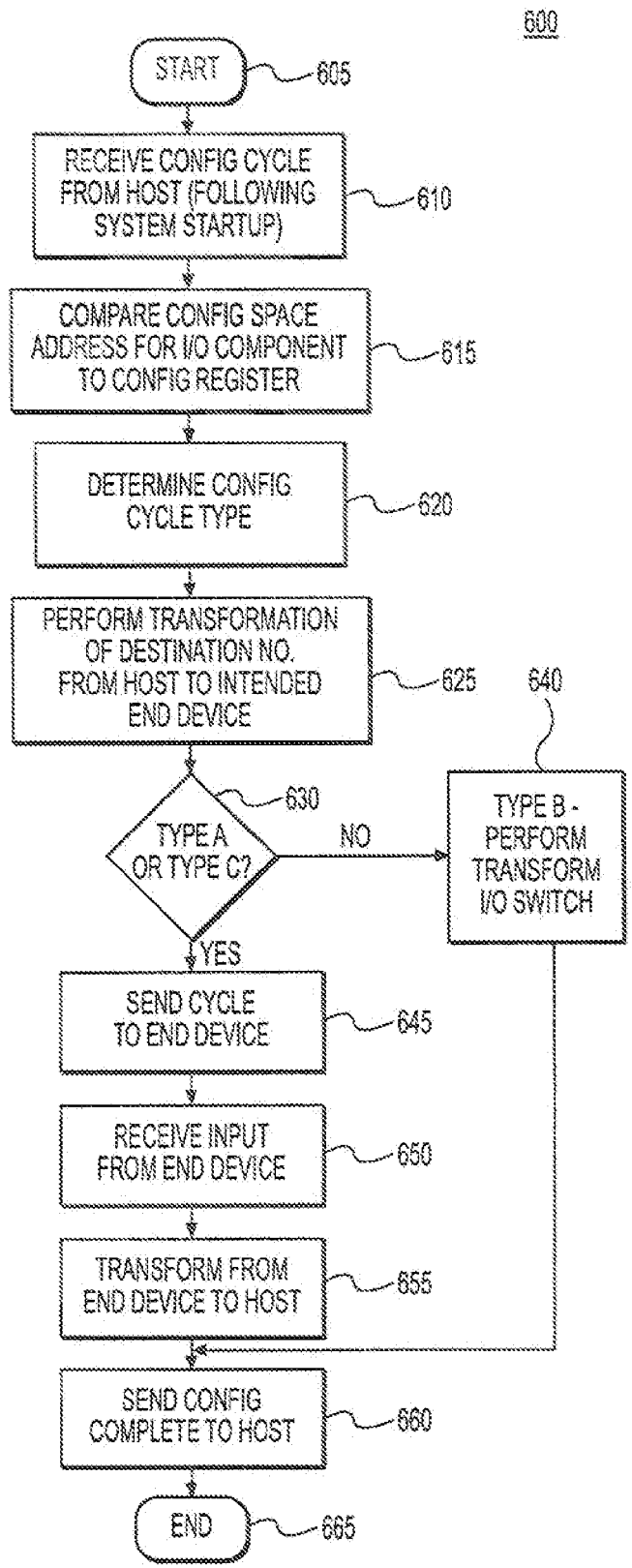
FIG. 7 is a flowchart illustrating an exemplary routine executed on the system of FIG. 3.

FIG. 7 is a flowchart illustrating an exemplary routine 600 executed on the system of FIG. 3. The routine starts with block 605. In block 610, switch platform 320 receives a configuration cycle from the host processor 310. In block 615, the processor 322 compares the configuration bus/device/function information, in the configuration cycle, for a specific end point device. In block 620, the processor determines which type of configuration cycle is being processed. In block 625, the processor 322 performs the needed bus/device/function transformation from the host device to the intended end device.

In block 630, the processor notes if the configuration cycle is Type A, B, or C. If the configuration cycle is not type A or C, the routine 600 moves to block 640, and the configuration cycle terminates in the switch platform 320. However, if the configuration cycle is either type A or C, the routine moves to block 645, and the configuration cycle is sent to the end device. In block 650, after suitable processing at the end device, the end device returns a configuration complete cycle. The configuration complete cycle is transformed (block 655) and the routine 600 moves to block 660 for sending to the host computer and then ending 665.

The invention claimed is:

1. A system for transforming a single root input/output Virtualization (SR-IOV) function to appear as a legacy function, comprising:
a switch platform coupled between a legacy host and a SR-IOV-enabled end device, the switch platform comprising:
a processor programmed to discern configuration cycles by type and to process the configuration cycles, and
one or more local registers that store data related to the configuration cycles.

2. The system of claim 1, wherein the configuration cycles relate an address space in a configuration register to a physical address of the end device.

3. The system of claim 1, wherein the end device is a PCIe I/O device.

4. The system of claim 1, further comprising means for translating an incoming memory cycle from the host processor into a memory cycle capable of being understood by the end device.

5. The system of claim 1, further comprising:
means for detecting a hot plug operation wherein a replacement device is inserted in place of the end device; and
means for configuring the replacement device such that virtual functions of the replacement device appear to the host processor as legacy functions.

6. A method for transforming between SR-IOV virtual functions of a SR-IOV end device and an address space of a legacy host processor, comprising:
receiving, at a switch platform intermediary between the end device and the host processor, a configuration cycle from the host processor;

comparing the configuration cycle from the host processor to a configuration register and determining a type of configuration cycle;

performing a transform operation on the received configuration cycle; and returning a configuration complete cycle to the host processor.

7. The method of claim 6, further comprising sending the transformed configuration cycle to the end device;

receiving a configuration complete signal from the end device; and transforming the received configuration complete signal to produce the configuration complete cycle.

8. The method of claim 7, further comprising transforming a memory access cycle by comparing an incoming memory cycle to a base address register in a configuration register, wherein a memory address is transformed.

9. The method of claim 6, further comprising:

receiving an indication of a hot plug operation wherein a replacement device is inserted in place of the end device;

sending a configuration cycle to switch platform; and receiving a configuration complete cycle from the end device.

10. The method of claim 9, further comprising:

storing information related to the replacement device in the switch platform; and generating the configuration complete cycle in the switch platform.

11. The method of claim 9, further comprising:

storing a first portion of the information related to the replacement device in the switch platform;

sending a second portion of the information related to the replacement device to the replacement device;

receiving from the replacement device, a configuration complete signal based on the received second portion of the information;

combining the stored first portion of the information and the configuration complete signal to generate the configuration complete cycle; and sending the configuration complete cycle to the host processor.

12. The method of claim 9, further comprising:

sending the configuration cycle to the replacement device;

receiving from the replacement device, a configuration complete signal;

transforming the received configuration complete signal; and sending the transformed signal, as a configuration complete cycle, to the host processor.

13. A system that performs transforms such that a legacy host processor can be assigned virtual functions of a SR-IOV end device, comprising:

an intelligent switch fabric intermediate between the host processor and the end device, the switch fabric including:

processing means to identify a type of end device from which a virtual function emanates, storage means for storing selected information related to the end device, means for transforming incoming host defined destination information into corresponding end device defined destination information, and means for transforming incoming end device completion information for the end device into corresponding completion information for the host processor; and means for receiving configuration cycles and configuration complete cycles at the switch fabric.

14. The system of claim 13, further comprising:

means for discovering a hot plug operation wherein a replacement device replaces the end device; and means for configuring the replacement device.

15. The system of claim 13, further comprising:

means for storing information related to bus/device/function information of the end device in the switch fabric; and generating the configuration complete cycle in the switch fabric.

16. The system of claim 13, further comprising:

means for storing a first portion of the information related to the end device in the switch fabric;

means for sending a second portion of the information related to the end device to the end device;

means for receiving from the end device, a configuration complete signal based on the received second portion of the information;

means for combining the stored first portion of the information and the configuration complete signal to generate the configuration complete cycle; and means for sending the configuration complete cycle to the host processor.

17. The system of claim 13, further comprising:

means for sending the configuration cycle to the end device;

means for receiving from the end device, a configuration complete signal;

means for transforming the received configuration complete signal; and means for sending the transformed signal, as a configuration complete cycle, to the host processor.

18. The system of claim 13, further comprising:

means for detecting a hot plug operation wherein a replacement device replaces the end device; and means for transforming bus/device/function information from the replacement device, wherein functions of the replacement device appear to the host processor as legacy functions.

19. The system of claim 1 further comprising the legacy host and the SR-IOV-enabled end device.

20. The system of claim 13 further comprising the legacy host processor and the SR-IOV-enabled end device.

* * * * *

UNITED STATES PATENT AND TRADEMARK OFFICE
CERTIFICATE OF CORRECTION

PATENT NO. : 8,386,654 B2  
APPLICATION NO. : 12/934035  
DATED : February 26, 2013  
INVENTOR(S) : Hubert E. Brinkmann et al.

Page 1 of 1

It is certified that error appears in the above-identified patent and that said Letters Patent is hereby corrected as shown below:

Title Page:

Item 75 Inventor name Brownall; Paul V. should be Brownell; Paul V.

Signed and Sealed this  
Twenty-first Day of May, 2013

Teresa Stanek Rea  
*Acting Director of the United States Patent and Trademark Office*